(12) United States Patent
Newton et al.

(10) Patent No.: US 7,567,788 B2
(45) Date of Patent: Jul. 28, 2009

(54) TRANSMITTER AND RECEIVER GAIN CALIBRATION BY MEANS OF FEEDBACK IN A TRANSCEIVER

(75) Inventors: Anthony Newton, Le Vaud (CH); Heinz Lehning, Tannay (CH)

(73) Assignee: Freescale Semiconductor, Inc., Austin, TX (US)

( * ) Notice: Subject to any disclaimer, the term of this patent is extended or adjusted under 35 U.S.C. 154(b) by 283 days.

(21) Appl. No.: 10/521,417

(22) PCT Filed: Jun. 25, 2003
(Under 37 CFR 1.47)

(86) PCT No.: PCT/EP03/06753

§ 371 (c)(1),
(2), (4) Date: Oct. 10, 2006

(87) PCT Pub. No.: WO2004/015895

PCT Pub. Date: Feb. 19, 2004

(65) Prior Publication Data

US 2007/0129031 A1    Jun. 7, 2007

(30) Foreign Application Priority Data

Jul. 5, 2002    (GB) ................... 0215582.8

(51) Int. Cl.
*H04B 17/00* (2006.01)
*H04B 1/40* (2006.01)
(52) U.S. Cl. ............... 455/237.1; 455/232.1; 455/127.2

(58) Field of Classification Search .............. 455/127.2, 455/226.1, 226.4, 232.1, 237.1, 253.2; 379/219, 379/22, 224, 27.01
See application file for complete search history.

(56) References Cited

U.S. PATENT DOCUMENTS

| 6,118,811 A | 9/2000 | Narumi |
| 6,842,489 B2 * | 1/2005 | Masenten ................... 375/261 |
| 7,203,472 B2 * | 4/2007 | Seppinen et al. ......... 455/226.1 |

OTHER PUBLICATIONS

Jarwala et al., "End-to-End Test Strategy for Wireless Systems," IEEE International Test Conference, 1995, pp. 940-946.

* cited by examiner

*Primary Examiner*—Blane J Jackson (57) ABSTRACT

The invention relates to gain calibration in a transceiver unit (100) having a transmitter unit and a receiver unit and a feed back coupling (165) between these. A signal level measurement unit (163) measures signal levels of a feedback signal through either the receiver unit or through a signal level detector (167). A reference signal level of the feedback signal is set by adjusting the transmitter until the signal level measurement unit (163) measures a predefined value when connected through the signal level detector (167). An absolute value of the transmitter gain is then calibrated. The signal level measurement unit (163) is connected through the receiver unit and the absolute gain of the receiver is calibrated. A gain is changed either in the receiver or the transmitter unit. The relative signal level change of the feedback signal is measured and used to calibrate the gain step.

21 Claims, 2 Drawing Sheets

TRANSMITTER AND RECEIVER GAIN CALIBRATION BY MEANS OF FEEDBACK IN A TRANSCEIVER

FIELD OF THE INVENTION

The invention relates to a method and apparatus for gain calibration and in particular for automatic calibration in a transceiver unit such as a HiperLAN transceiver.

BACKGROUND OF THE INVENTION

In recent years, increasing focus has been given to wireless communication between different communication and computational devices using Wireless Local Area Networks (WLANs). One such WLAN technology is High Performance Radio Local Area Network Type 2 (HiperLAN2), which has been standardised by the European Telecommunications Standards Institute (ETSI). HiperLAN2 enables wireless, communication of very high data rates (up to 54 Mbps) over short ranges. HiperLAN operates in the 5 GHz frequency range, uses Orthogonal Frequency Division Multiplex (OFDM) transmission techniques and supports different Quality of Service (QoS) for different connections. HiperLAN2 may thus carry different services including various data services, voice or video services.

In HiperLAN2, mobile terminals communicate with an access point which is typically connected to a fixed network and/or other access points. The specification for the physical layer of HiperLAN2 is specified in ETSI Technical Specification TS 101 475, which specify that a precise receive power measurement and precise transmit power control must be implemented. Specifically, TS 101 475 specifies that the mobile terminal must control the transmit power such that the transmitted signal is received at a given level at the access point independent of the distance between the access point and the mobile terminal. To enable this, the access point broadcasts information about the transmit power level it uses, as well as the given receive level it expects. This information is used by the mobile terminal to calculate the transmit power by assuming that the path loss from the access point to the mobile terminal (downlink) is approximately equal to the path loss from the mobile terminal to the access point (uplink). Hence, the transmit power of the mobile terminal can be determined as $$P_{Transmit,MT} = P_{Receive,AP} + P_{Transmit,AP} - P_{Receive,MT}$$

wherein $P_{Transmit,MT}$ is the required transmit power of the mobile terminal to meet the given receive level at the access point, $P_{Receive,AP}$ is the given receive level at the access point, $P_{Transmit,AP}$ is the transmit power level of the access point, $P_{Receive,MT}$ is the received level at the mobile terminal of the transmission from the access point and all values are measured in dBm. Hence, in order to meet the specification, the mobile terminal must be able to accurately measure $P_{Receive,MT}$ and control $P_{Transmit,MT}$.

With usual semiconductor technology, the transceivers cannot be fabricated such that the transmitted power levels have sufficient precision. Specifically, for HiperLAN the dynamic range of the RF input signal is from −85 dBm to −20 dBm. Thus considerable gain and gain variation are required through the receiver chain. The circuit must measure the received power in 1 dB steps with ±5 dB precision (±8 dB at the ends of the range), which is exceedingly difficult to achieve without calibration. Likewise, the transmitter has to cover a power range from −15 to +23 dBm for the lower Hiperlan2 band, and −15 to +30 dBm for the higher Hiperlan2 band, with power steps of 3 dB and a precision that ranges from ±4 dB (access point at high power) to ±10 dB (mobile terminal at low power). Further due to the high peak to average value, OFDM requires high linearity over a wide dynamic range and meeting the requirements for the transmitter and especially the power amplifier cannot easily be achieved by current technology.

Thus high accuracy is required both of the receiver and the transmitter over a wide dynamic range, and to achieve this it is necessary to calibrate both the receiver and transmitter. Calibration is commonly performed at manufacturing of electronic equipment. However, this has a number of disadvantages including It does not take into account variations occurring after manufacturing. These variations can be very significant as a consequence of component drift, ageing and temperature variations.

Manual calibration can be very time consuming and thus costly requiring special test setup and measurement circuitry.

The calibration must be maintained throughout the lifetime of the product either by storing calibration values in non-volatile memory or by setting of adjustable components (such as a variable resistor or potentiometer), thus requiring additional components.

One system of calibration is described in U.S. Pat. No. 6,272,322. In this system a pair of receivers perform a loop back test to determine a relationship between the transmit and receive gain for each transceiver. A path loss between the first transceiver and the second transceiver is computed by transmitting a pair of signals in opposite directions to determine the relationship between the transmit gain of one receiver and the receive gain of the second receiver. The individual transmit gain and receive gain is calculated from this relationship. The system described is relatively complex and specifically requires two transceivers operable to communicate with each other. U.S. Pat. No. 6,118,811 discloses a transceiver that can insert calibration signals of known level and frequency into transmitters for calibration and correction of transmitter parameters. An output of the calibrated and corrected transmitter can then be subsequently coupled into a mixer together with a receiver local oscillator signal and input to a receiver for calibrating and correcting receiver parameters based on the calibrated and corrected transmitter output. Thus an improved system of calibration would be advantageous.

SUMMARY OF THE INVENTION

Accordingly the Invention seeks to provide a system of calibration of a transceiver mitigating one or more of the above mentioned disadvantages of the prior art. Accordingly there is provided a method of gain calibration for a transceiver having a transmitter unit and a receiver unit and including a feed back coupling from the transmitter unit to the receiver unit, the feed back coupling comprising a measurement point; the method comprising the steps of: setting a reference signal level of a feedback signal at the measurement point by adjusting characteristics of the transmitter unit in response to a signal level detector measurement by a signal level measurement unit when coupled to the measurement point through a signal level detector; measuring, by the measurement unit when coupled to the measurement unit through the receiver unit, a measurement reference value associated with the reference signal level; changing a gain parameter of a transceiver unit of the transceiver by a gain step; and measuring, by the measurement unit when coupled to the measurement unit through the receiver unit, at least one measurement of a feedback signal level of the feedback signal; determining a relative effect of the gain step on the feedback signal level in response to the at least one measurement relative to the measurement reference value; and calibrating the gain step in response to a relative effect of the gain step on the feedback signal.

Thus the invention provides a system for accurate calibration based on relative effects on a feedback signal resulting from a gain step. Thus absolute characteristics of the transmitter, receiver and measurement circuitry does not affect the calibration accuracy. Further a reference signal is set using dedicated circuitry whereby high accuracy of this reference level can be achieved. The invention is further well suited for automatic calibration, and thus accurate calibration of the transceiver can be carried out regularly without manual intervention. Hence, the calibration is not time consuming and is not limited to the manufacturing process. Consequently, the transceiver can be regularly calibrated throughout its lifetime, thereby ensuring optimum performance and insensitivity to drift, ageing etc. Further, the use of a measurement path through the signal level detector only at a given reference signal level allows high accuracy even for simple and low cost implementations of the measurement path. Thus the invention provides accurate calibration using few and cheap measurement components According to one feature of the invention the relative effect is determined as a relative change of the at least one measurement with respect to the measurement reference value and preferably the relative effect is determined as the difference between the at least one measurement and the measurement reference value. This provides a simple system for determining the relative effect. The system is well suited for automatic calibration and is preferably used for calibration of the receiver unit of the transceiver. It further provides for very accurate calibration, as the measurement error is mainly resulting from measurement errors of the signal level measurement unit, which can be kept very low—especially if implemented in the digital domain.

According to a second feature of the invention the relative effect is determined as a relative change in the feedback signal level required to achieve a predefined relationship between the at least one measurement and the measurement reference value. Preferably the predefined relationship is that the at least one measurement is substantially equal to the measurement reference value and more specifically the step of calibrating the gain step preferably comprises determining the gain step as substantially being the same value as the relative effect.

This provides for a very simple system for calibration of the transceiver which is well suited for automatic calibration. Further it allows very accurate calibration as the control of the signal level of the feedback signal can be implemented with high accuracy—especially if a digitally generated calibration signal is used. It further provides the advantage of the measurement of the signal level measurement unit requiring a low dynamic range of high accuracy. Further it ensures that signal levels associated with the signal level measurement unit are relatively constant, and thus specifically that the loading of possible Digital to Analog Converters (ADCs) can be optimised.

According to a third feature of the invention, the transmitter comprises a signal generator coupled to the feed back coupling through a transmit path having a transmit path gain and further comprising the step of: setting a known level at the signal generator; adjusting the transmit path gain until the measurement unit, when connected to the measurement point through the signal level detector, measures a level equal to the measurement reference value; and calibrating an absolute value of the transmit path gain as a function of the known signal level and a predetermined relationship between the reference signal level and a measurement value of the measurement unit when connected to the measurement point through the signal level detector.

This provides for a very accurate absolute gain calibration of the transmit gain which can serve as the basis for converting the relative gain calibration into an absolute gain calibration.

According to a fourth feature of the invention, the receiver comprises a receive path having a receive path gain and further comprising the step of calibrating an absolute value of the receive path gain in response to the measurement reference value and the reference signal level.

This provides for a very accurate absolute gain calibration of the receiver gain, which can serve as the basis for converting the relative gain calibration into an absolute gain calibration.

According to a fifth feature of the invention, the transceiver unit is the transmitter unit having a transmit path having a transmit path gain and the gain step is a gain step of the transmit path gain. This provides for accurate calibration of the transmitter unit.

According to a sixth feature of the invention, the transmitter unit comprises a digital signal generator for generating a calibration signal coupled to the measurement point through the transmit path, the transmit path being an analog transmit path. This provides a method of calibration wherein relative gain steps are calibrated very accurately due to the relative value being determined based only on digital adjustments.

According to a seventh feature of the invention, the gain step is associated with a change of a signal level of the calibration signal and the calibration of the gain step is further in response to the change in the signal level of the calibration signal whereby the feedback signal is maintained within a given dynamic range. Thus the feedback signal can be kept within the dynamic range of the receiver unit.

According to an eighth feature of the invention, the transceiver unit is the receiver unit having a receive path gain and the gain step is a gain step of the receive path gain. This provides for accurate calibration of the receiver unit.

According to a ninth feature of the invention, the transmitter unit comprises a digital signal generator for generating a calibration signal coupled to the measurement path through a transmit path, and the relative change in the feedback signal level required to achieve a predefined relationship between the at least one measurement and the measurement reference value is determined by adjusting an output level of the digital signal generator. This provides accurate calibration as the digital signal generator can be implemented with high precision and accuracy.

According to a tenth feature of the invention, the step of changing a gain of the transmit path and adjusting the output level of the digital signal generator such that the measurement reference value is measured by the measurement unit. Thereby an accurate calibration of a large gain range is accomplished from a signal generator with lower dynamic range, with the accuracy of the signal generator being maintained.

According to an eleventh feature of the invention, the feedback signal is a calibration signal of constant amplitude. This provides the advantage of the calibration signal being independent of time varying or stochastic variations of the calibration signal and allows for simple construction of the signal level detector—such as a simple peak detector.

According to a twelfth feature of the invention, the measurement unit is digital and the coupling from the measurement point to the measurement unit through the signal level detector does not comprise any analog signal path of the receiver unit. This provides a method of calibration wherein relative gain steps are calibrated very accurately due to the relative value being determined based only on digital measurements.

According to thirteenth feature of the invention, the steps of changing the gain parameter, measuring the at least one measurement, determining a relative effect and calibrating the gain step are iterated whereby calibration across a dynamic gain range is achieved. Thus an accurate absolute gain calibration can be performed at a reference signal level, and an accurate gain calibration can be achieved for an entire gain range using accurate relative gain measurements. Preferably the step of determining the relative effect is further in response to the relative effect determined in previous iterations.

According to a fourteenth feature of the invention, the signal level detector has a limited dynamic input range of low distortion and the reference signal level is set to fall within this dynamic range. This allows a simple and cheap construction of the signal level detector as accuracy is only required for a small range of values.

According to a second feature of the invention, there is provided an apparatus for gain calibration for a transceiver having a transmitter unit and a receiver unit and including a feed back coupling from the transmitter unit to the receiver unit, the feed back coupling comprising a measurement point; the apparatus comprising: a signal level measurement unit for measuring signal levels related to a feedback signal at the measurement point; the signal level measurement unit operable to be coupled to the measurement point through the receiver unit and/or through a signal level detector; means for setting a reference signal level of the feedback signal at the measurement point by adjusting characteristics of the transmitter unit in response to a signal level detector measurement by the signal level measurement unit when coupled to the measurement point through the signal level detector; means for measuring, by the measurement unit when coupled to the measurement unit through the receiver unit, a measurement reference value associated with the reference signal level; means for changing a gain parameter of a transceiver unit of the transceiver by a gain step; and means for measuring, by the measurement unit when coupled to the measurement unit through the receiver unit, at least one measurement of a feedback signal level of the feedback signal; means for determining a relative effect of the gain step on the feedback signal level in response to the at least one measurement relative to the measurement reference value; and means for calibrating the gain step in response to a relative effect of the gain step on the feedback signal.

Thus, a significant advantage of the calibration method described is that the measurement path, and thus the signal level detector, is only used for the feedback signal being at the reference signal level. Consequently a simple low cost signal level detector can be used, while still achieving a high degree of accuracy of calibration across an extensive gain range. The gain range can be much larger than the dynamic range of the signal generator, yet the accuracy of the signal generator is retained.

BRIEF DESCRIPTION OF THE DRAWINGS

An embodiment of the invention will be described, by way of example only, with reference to the drawings, in which.

DETAILED DESCRIPTION OF A PREFERRED EMBODIMENT OF THE INVENTION

For clarity, the following description of a preferred embodiment of the invention focuses on the application in a HiperLAN2 transceiver, but it will be apparent that the invention is not limited to this application and can be used in a variety of transceivers requiring or benefiting from calibration.

Figure 1:
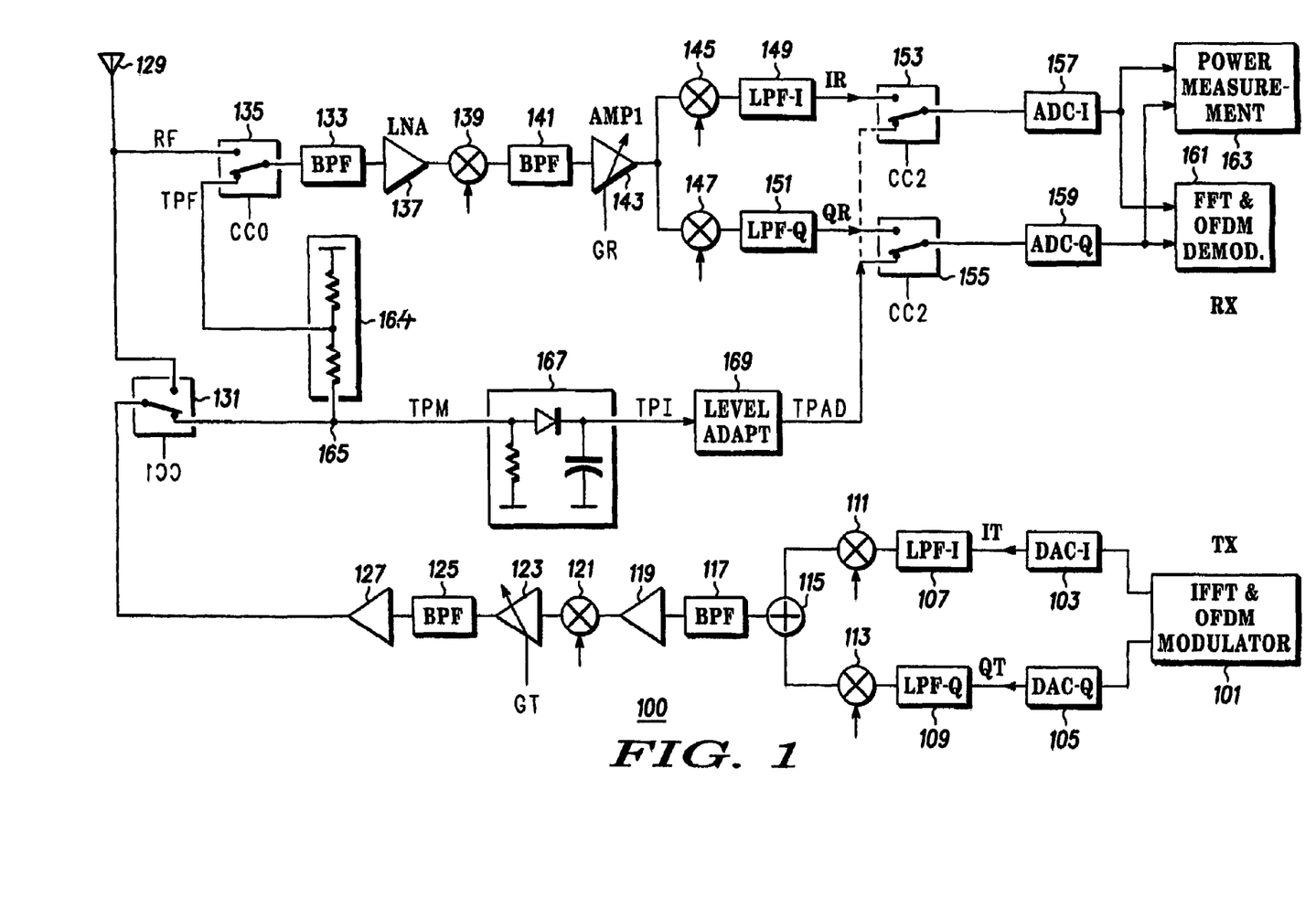
FIG. 1 is an illustration of a cellular communication system in accordance with the prior art.

FIG. 1 is an illustration of a HiperLAN2 transceiver in accordance with a preferred embodiment of the invention.

A transmitter unit comprises a digital part and an analog part. The digital part comprises an Inverse Fast Fourier Transform (iFFT) 101 function for modulating a data stream to be communicated into a plurality of subchannels, as are well known for OFDM transmitters. The iFFT 101 is complex and produces an in-phase (I) and quadrature (Q) signal. Each of the I and Q signals are converted to analog signals in each of the two Digital to Analog Converters (DAC) 103,105. The converted I and Q signals are low pass filtered in Low Pass Filters (LPF) 107, 109 to remove the high frequency components introduced by the DACs 103, 105. The low pass filtered signals are quadrature modulated in mixers 111,113 by local oscillator signals with 90 phase offset between the I and Q channels. The I and Q signals are summed in a summer 115, and the resulting signal is filtered in a band pass filter 117 (BPF), amplified in an amplifier 119 and up-converted to the transmit frequency by a second mixer 121. The up-converted signal is amplified by a first amplifier 123 having a variable gain, and after a second bandpass filter 125 by a transmit power amplifier 127. The power amplifier is connected to the antenna 129 through a transmitter switch 131.

A receiver unit of the transceiver comprises an input band pass filter 133 (BPF) for removing signal components outside the desired frequency band, and in particular the mirror frequency associated with subsequent down conversion. The band pass filter 133 is connected to the antenna 129 through a receiver switch 135. Typically both the receiver unit and the transmitter unit are coupled to the same antenna 129 through a duplexer (not shown). The filtered antenna signal is fed from the band pass filter 133 to a low noise amplifier 137 (LNA), which amplifies the received signal. The low noise amplifier 137 is designed with a very low noise figure and amplifies the signal to a level, at which the noise introduced in later stages of the receive process is low in comparison to the signal level. Therefore, the noise of the later stages does not significantly impact the receiver performance. The signal from the low noise amplifier is down-converted to an intermediate frequency (IF) in the mixer 139 and the down-converted signal is filtered in a second band-pass filter 141 which typically has a steeper frequency response than the input band-pass filter 133. Typically, the second band pass filter 141 determines the frequency response of the receive path in and around the required frequency band. Specifically, the bandwidth of the second band pass filter may be equal to a communication channel bandwidth rather than the bandwidth of the entire frequency band. Selection of the appropriate channel is performed by control of the down-conversion frequency.

The band pass filtered signal is amplified in an IF amplifier 143 having a variable gain before being down-converted to In-phase (I) and Quadrature (Q) channels by multiplication in mixers 145, 147 of the signal with local oscillator signals with 90 degree phase offset. Each of the I and Q base band signals is fed to an Analog to Digital Converter 157, 159 (ADC) through an ADC switch 153, 155. The digitised complex base band signal is fed to a Fast Fourier Transform and OFDM demodulator 161, which demodulates the signal to retrieve the data, as is well known in the art. In addition, the ADCs 157, 159 are connected to a digital signal level measurement at that generates a measure related to the signal level of the received signal. In one embodiment, the signal level measurement unit is a simple power level measurement unit performing the operation of $$P = \alpha \cdot \sum_N i_n^2 + q_n^2$$

where $\alpha$ is a proportionally constant, $i_n$ is the n'th sample in the I-channel, $q_n$ is the n'th sample in the Q-channel and N is the length of an averaging window applied to the measurement.

Alternatively, the signal level measurement unit 163 may consist in any functionality that provides a measure related to the signal level of the received signal, including an amplitude level measurement. Preferably, the measure generated by the signal level measurement unit 163 is monotonically increasing with increasing signal level.

In accordance with a preferred embodiment of the invention, the transceiver comprises a feed back coupling between the transmitter and the receiver unit. In FIG. 1 this function is formed by the transmitter switch 131 and receiver switch 135 when in the lower switch position, as well as an attenuator 164. The attenuator 164 shown in FIG. 1 simply comprises two resistors R2 and R3 in a known voltage divider configuration. Alternatively, the feedback coupling comprise any suitable attenuator, may not comprise an attenuator and/or may include any other circuitry allowing a feed back coupling from the transmitter unit to the receiver unit to exist. The feed back coupling further comprises a measurement point 165, which in the specific embodiment of FIG. 1 is the point between the transmitter switch 131 and the attenuator 164.

The transmitter switch 131 is operable to switch between an upper position, in which the transmitter unit is coupled to the antenna 129, and a lower position in which the transmitter is coupled to the feedback coupling and the measurement point 165. Similarly, the receiver switch 135 is operable to switch between an upper position in which the receiver unit is connected to the antenna 129, and a lower position in which the receiver unit is coupled to the feedback coupling and, thus, through the attenuator 164 to the measurement point 165.

In some embodiments, the feed back coupling is permanently enabled, and the transceiver does not comprise switches for coupling the transceiver units between an antenna and the feed back coupling. In these embodiments, additional circuitry may be included for combining the feed back signals with the received signals. In one specific embodiment, the calibration is performed by a pure sine wave at a given frequency, and the calibration signal is isolated in the receiver by filtering. It is within the contemplation of the invention, that any suitable method and circuitry for forming a feed back coupling may be used, as well as any suitable method and circuitry for interfacing this with the receiver and transmitter units.

Further, a signal level detector 167 is connected to the measurement point 165. The output of the signal detector is in the described embodiment connected to a level adapter 169, the output of which is connected to the ADCs 157, 159 through the ADC switches 153, 155. The two ADC switches 153, 155 are each operable to switch between an upper position wherein the I and Q ADC 157, 159 is connected to the low pass filters 149, 151 of the receive path, and a lower position wherein the ADC 157, 159 of each switch is connected to the output of the level adapter 169. In this position, the ADC 157, 159 is thus fed the signal from the output of the signal level detector 167 as modified by the level adapter 169. The level adapter 169 is optional and simply provides the function of adjusting the level of the signal at the output of the signal level detector 167 to a level appropriate for the ADCs 157, 159. In the preferred embodiment, the level adapter 169 comprises a standard operational amplifier coupled to provide a suitable static gain (typically less than one). In other embodiments, the level adapter may attenuate the signal level and/or be adjusted in response to the signal level at the output of the signal level indicator 167. In the preferred embodiment, the output of the level adapter 169 is coupled to both ADC switches 153, 155 and thus to both ADCs 157, 159. In other embodiments, the output of the level adapter 169 may only be connected to one switch. In some embodiments, no switches are employed, and the signal from the level adapter is coupled to the signal level measurement unit 163 through other suitable means, such as for example through an additional dedicated ADC.

The signal level detector 167 is preferably a power detector. In the preferred embodiment, the signal level detector 167 is a simple amplitude peak detector comprising a resistor R1, a diode C and a capacitor C as is well known in the art. The value of the capacitor C is set such that it, together with the input impedance of the level adapter 169, provides a suitable dynamic performance of the peak detector. The dynamic performance is preferably such that signal level variations are filtered while changes in the signal level at the measurement point 167 are measured sufficiently fast. Alternatively, the power detector may comprise a second resistor in parallel with the capacitor. If the second resistor is significantly less than the input impedance of the level adapter, the time constant of the peak detector, and thus the dynamic performance, can be determined by the capacitor value and the resistance of the second resistor.

Figure 2:
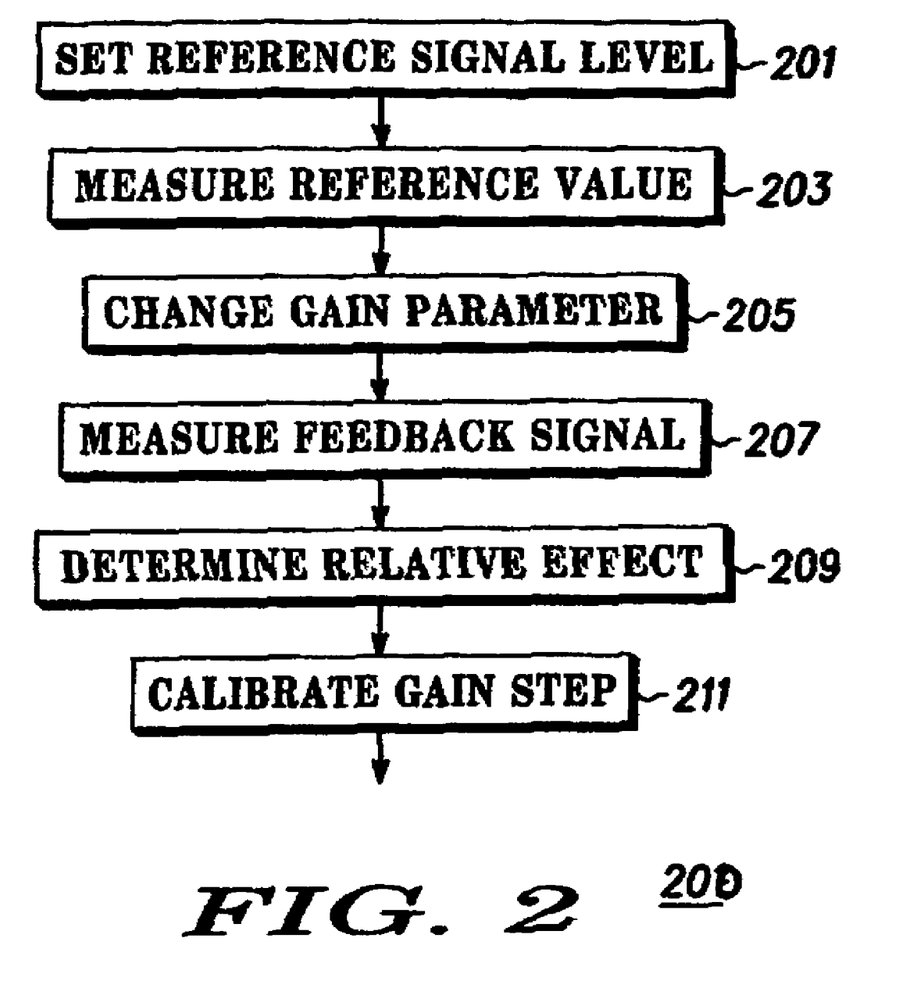
FIG. 2 shows a flow chart for a method of calibration in accordance with an embodiment of the invention.

FIG. 2 shows a flow chart 200 for a method of calibration in accordance with an embodiment of the invention. The method will be described with reference to the transceiver of FIG. 1

In step 201, a reference signal level of a feedback signal at the measurement point 165 is set by adjusting characteristics of the transmitter unit in response to a signal level detector measurement by the signal level measurement unit 163 when coupled to the measurement point 165 through the signal level detector 167.

Initially, the transmitter switch 131 and the ADC switches 153, 155 are switched to the lower switch position whereby a path is formed from the transmitter output to the signal level measurement unit 163 through the transmit switch 131, measurement point 165, signal level detector 167, level adapter 169, ADC switches 153, 155 and ADCs 157, 159. Thus the signal level measurement unit 163 is coupled such that it can measure the signal level, and in the preferred embodiment, the power level of the feed back signal at the measurement point 165. The feed back signal is generated in the transmitter, and in the preferred embodiment a constant amplitude sine wave with a frequency in the transmit frequency band is used as a dedicated calibration signal. The calibration signal is generated by the digital OFDM modulator 101. The signal level of the feedback signal can be adjusted in various ways, including adjusting the amplitude of the generated digital calibration signal or adjusting a gain of a first amplifier 123 in the transmit having a variable gain G. In the preferred embodiment, a characteristic of the transmitter is adjusted such that the signal level measurement unit 163 measures a given reference signal level. Specifically the signal level of the digital calibration signal is set to a level suitable for the dynamic range of the DACs 103, 105, and the gain of the first amplifier 119 is adjusted such that the reference signal level is measured. In other embodiments, other parameters may be set such as for example the signal level of the digital calibration signal or a reference voltage for the DACs.

Any suitable reference level can be used but preferably a reference level is set as large as possible in order to minimise the impact of noise and distortion yet ensuring that the signal level throughout the transmit path, receive path, measurement path, digital to analog conversion and analog to digital conversion is within the dynamic range of the circuitry. In the preferred embodiment, the reference signal level is set to 18 dBm.

Further, the measurement path through the signal level detector 167 is preferably pre-calibrated such that the specific characteristics of all components used in this path are compensated for. Specifically, during manufacturing of the transceiver, an accurate signal level meter is coupled to the measurement point 165, and the transmitter is adjusted to provide the required signal level as measured on the accurate signal level meter. The value measured by the signal level measurement unit 163 is then derived and stored. During calibration, in accordance with an embodiment of the invention, the reference level is set by adjusting the transmitter until the signal level measurement unit 163 measures a value corresponding to the stored reference value. Alternatively, a gain in the measurement path may be adjusted such that the signal level measurement unit 163 measures a predefined value when the accurate signal level meter measures the desired reference level. This adjustment can for example be achieved by manually adjusting the gain of the level adapter e.g. by adjusting a variable resistor. By pre-calibrating the measurement path a very precise initial setting of the reference signal level of the feedback signal at the measurement point 165 can be achieved. As this forms the basis for the subsequent calibration, a high accuracy of the entire calibration is achieved.

In step 203, a measurement reference value associated with the reference signal level is measured by the measurement unit when coupled to the measurement unit through the receiver unit.

In this step, the ADC switches 153, 155 are switched from the lower position to the upper position and the receiver switch is set at the lower position. Consequently, the signal level measurement unit 163 is coupled to the measurement point 165 through the attenuator 164, the receiver path, the ADC switches 153, 155 and the ADCs 157, 159. The characteristics of the transmitter are not changed and thus the signal level measurement unit 163 is now measuring a measurement reference value which corresponds to measuring the reference signal level through the receiver unit.

In step 205, a gain parameter of a transceiver unit of the transceiver is changed by a gain step. In the preferred embodiment, either a gain associated with the transmitter unit, such as the gain of the first amplifier 123, or a gain associated with the receiver unit, such as the gain of the IF amplifier 143, is changed. The gain step may be of any suitable size, and in one embodiment the gain step is infinitesimal such that repeating the calibration with additional gain steps corresponds to a continuous variation of a gain associated with the transceiver unit over a gain range.

Step 207 comprises measuring, by the measurement unit when coupled to the measurement unit through the receiver unit, at least one measurement of a feedback signal level of the feedback signal.

As a consequence of the gain step, the signal level measured by the signal level measurement unit 163 will have changed. If the gain step is of the transmitter, the signal level of the feed back signal has changed, and thus the measurement will change as the receiver path and signal level measurement unit 163 is unchanged. If the gain step is of the receiver, the signal level of the feedback signal is unchanged but as the gain of the receiver path has changed, the signal level at the ADCs will have changed, and thus the measurement by the signal level measurement unit 163 will change.

In step 209, a relative effect of the gain step on the feedback signal level is determined in response to the at least one measurement relative to the measurement reference value. In the case of the gain step being of the transmitter unit, the feedback signal level changes, and the relative effect is in the preferred embodiment determined as the difference in the signal level of the feedback signal. This difference is determined as the difference between the measurement(s) of the signal level measurement unit 163 and the measurement reference value. Thus, if the difference between the measurement and the measurement reference value is, say 2 dB, the relative effect is determined as a signal level variation of 2 dB.

In the case of the gain step being of the receiver, the measurement of the signal level measurement unit 163 changes for the same signal level of the feedback signal. In this case, the relative effect is in the preferred embodiment determined as the change required in the signal level of the feedback signal in order for the signal level measurement unit 163 to measure a value substantially equal to the measurement reference value. Thus in the preferred embodiment, the signal level of the feedback signal is adjusted by adjusting a characteristic of the transmitter until the signal level measurement unit 163 again measures a value similar to the measurement reference value. Preferably, this adjustment is made by changing the amplitude of the digital calibration signal. As this adjustment is made in the digital domain, it can be performed with high accuracy. In the preferred embodiment, the relative effect is thus determined as the change in signal level of the digital signal generator in order to measure substantially the same value as the reference value. Thus if the change in signal level of the digital calibration signal is, say, 2 dB the relative effect is determined as a signal level variation of 2 dB.

Alternatively or additionally, the adjustment of a characteristic of the transmitter may for example be achieved by an accurately measured variation of a gain of any suitable component in the transmit path. Specifically, the component may be an analog component such as preferable the first amplifier. In practice, the required accuracy for such a gain step is significantly facilitated by calibration of the transmit path prior to the calibration of the receive path.

Step 211 comprises calibrating the gain step in response to a relative effect of the gain step on the feedback signal. In the preferred embodiment, the gain step is simply calibrated as the relative effect determined as previously described, i.e. as the difference in the measurement of the signal level measurement unit for transmitter calibration, and as the difference in signal level for receiver calibration. However, in other embodiments, any suitable function for relating a relative effect of the gain step on the feedback signal to a calibration value of the gain step can be used. For example, a conversion function may be used which takes into account known dependency of e.g. the receiver path gain or the signal level measurement unit 163 on absolute input signal levels. In other embodiments, conversion functions further including other parameters or measurements may be used.

In the following, the preferred embodiment of the invention is described in further detail. Initially, calibration of a transmitter unit of the transceiver unit will be described followed by a description of an embodiment of calibration of a receiver unit. In the preferred embodiment both the transmitter and receiver unit are calibrated in accordance with the described embodiments.

In the preferred embodiment, the transmitter comprises a signal generator coupled to the feedback coupling through the transmit path. In FIG. 1 the signal generator is formed by the OFDM modulator 101, which is operable to generate a digital calibration signal as previously described. In the preferred embodiment, an absolute value of the transmit path gain $G_{T,Ref}$ is then determined by setting a known level at the signal generator; adjusting the transmit path gain until the measurement unit, when connected to the measurement point through the power detector, measures a level equal to the measurement reference value; and calibrating the absolute value of the transmit path gain $G_{T,Ref}$ as a function of the known signal level and a predetermined relationship between the reference signal level and a measurement value of the measurement unit when connected to the measurement point through the power detector.

Specifically, the transmitter switch 131 and the ADC switches 153, 155 are initially set to the lower position thereby setting up a measurement path for the signal level measurement unit 163 through the signal level detector 167 as previously described.

The gain of the transmit path is set to a minimum and specifically the gain of the first amplifier 123 is set to a minimum. A known value of the signal generator is then set by setting the calibration signal from the OFDM modulator 101 to the maximum amplitude possible while maintaining a reasonable margin to saturation of the DACs. In the preferred embodiment, a sinusoidal signal at 5 MHz is generated by the iFFT of the OFDM modulator 101 by applying a constant amplitude to one sub-channel while applying a zero signal to all other sub-channels. Alternatively, a dedicated signal generator can be used. Measurements are made by the signal level measurement unit 163 while the gain of the first transmitter 123 is gradually increased until the measurement is equal to the value corresponding to the given reference signal level of the feedback signal at the measurement point 165. Preferably, the measured value has been predetermined by pre-calibration during manufacturing as previously described.

The setting for which the signal level of the feedback signal is identical to the reference signal is used as the reference gain setting for the first amplifier 123. The feedback signal at the measurement point corresponds to the output signal of the transmit signal, and as the signal level of this is now accurately known to be equal to the signal reference level, and further the signal level of the calibration signal is known with high accuracy, the absolute reference gain value $G_{T,Ref}$ of the transmit path for the reference gain setting can accurately be determined as $$G_{T,Ref} = P_{Ref} - P_{Cal}$$

wherein $G_{T,Ref}$ is measured in dB, $P_{Ref}$ is the reference signal level of the feedback signal measured in dBm and $P_{Cal}$ is the signal level of the calibration signal measured in dBm.

Thus, an accurate calibration of an absolute value of a reference gain of the transmit path is achieved. In systems where the gain steps of the first amplifier 123 are fairly high, the accurate setting of the reference signal level may be accomplished by setting the gain of the first amplifier 123 such that the measurement of the signal level measurement unit 163 is close to the desired value, followed by a fine adjustment of the level by adjusting the signal level of the calibration signal. Thus, specifically, the gain of the first amplifier may be increased until the signal level is above the reference signal level, at which point the gain is reduced one step and the signal level of the calibration signal is gradually increased until the correct level is reached.

Following the accurate calibration of the absolute level of the transmit gain $G_{T,Ref}$, the ADC switches 153, 155 are changed to the upper position thereby connecting the signal level measurement unit 163 to the measurement point 165 through the receiver path. The signal level of the feedback signal is still at the reference signal level, and the measurement of the signal level measurement unit 163 corresponding to this level is stored as a measurement reference level.

A gain step of the transmit path is then performed by adjusting the gain of the first power amplifier by a step. In the preferred embodiment, the gain of the first amplifier 123 is controlled by digital control signals and the step size is equal to the lowest step possible, i.e. equal to a quantisation step for the gain of the first amplifier 123. Following the gains step and after allowing sufficient time for the system to settle, a measurement is made by the signal level measurement unit 163. In the preferred embodiment, the gain of the first amplifier 123 is initially reduced by one setting and consequently the signal level measurement by the signal level measurement unit 163 will be lower than the reference measurement value.

A relative effect on the signal level of the feedback signal is determined as a change in the measurement of the signal level measurement unit 163 and specifically as the difference between the new measurement value and the measurement reference value. The gain step is then calibrated as the difference between the measurement values. Thus the calibrated gain of the gain step is determined as $$\Delta G(-1) = P(-1) - P_{Meas,Ref}$$

where $\Delta G(-1)$ is the relative value of the gains step in dB (and is negative for a reduction in gain), $P_{Meas,Ref}$ is the measurement reference value in dBm and $P(-1)$ is the measured value of the signal level measurement unit following the gain step.

Thus the accuracy of the calibration step is given by the accuracy of the signal level measurement unit 163 and the linearity and noise of the receive path. However, as the signal level measurement unit 163 is implemented in the digital domain, a high accuracy can be achieved, which is further insensitive to temperature variations, drift, ageing etc. Further, in order to receive communication signals, the receive path is already designed with very low noise and high linearity. Especially, for OFDM receivers, the linearity requirements are very strict as it must provide suitable performance for signals having a very high amplitude peak to mean ratio. Thus a very accurate calibration of the gain step is achieved.

The absolute value of the new gain setting $G(-1)$ can simply be determined as $$G(-1) = G_{T,Ref} + \Delta G(-1)$$

Once the first gain step has been calibrated, the calibration is repeated for the next gain step. Thus the gain of the first amplifier 123 is changed to the setting immediately below the previous gain setting, and the new measurement $P(-2)$ by the signal level measurement unit 163 is determined. The relative gain calibration for this step is determined from $$\Delta G(-2) = P(-2) - P(-1)$$

The absolute value of this gain setting is then calibrated from $$G(-2)=G(-1)+\Delta G(-2)=G_{T,Ref}+\Delta G(-1)+\Delta G(-2)=G_{T,Ref}-P_{Meas,Ref}+P(-2)$$

The calibration is repeated for further gain steps until the desired dynamic range below the reference signal level is covered. In the preferred embodiment, the process is repeated for a dynamic range of the signal level at the output of the transmitter from the reference signal level of 18 dBm down to −15 dBm thereby covering a dynamic range of 33 dB.

In the preferred embodiment, the transmitter unit comprises a digital signal generator in the form of the OFDM modulator for generating the calibration signal. The digital signal generator is coupled to the measurement point through the analog transmit path. This provides for a very accurate control of the signal level of the calibration signal and especially, it allows very accurate relative signal level changes to be made.

In some embodiments, and especially embodiments similar to the preferred embodiment, the gain step is associated with a change of a signal level of the calibration signal and the calibration of the gain step is further in response to the change in the signal level of the calibration signal. Thus, in some embodiments some or all of the gain steps are followed by an adjustment of the signal level of the calibration signal. For example, if the gain of the first amplifier 123 is reduced by a gain step, the signal level of the calibration signal is increased by a suitable value. As the signal generator for the calibration signal is digital, this value can be known with high precision. The calibration of the first gain step can thus be derived from $$\Delta G(-1)=P(-1)-P_{Meas,Ref}+P_{\Delta Cal}$$

wherein $P_{\Delta Cal}$ is the change in the signal level of the calibration signal corresponding to the gain step. The calibration of further gain steps can be performed in a similar way. Preferably, the calibration signal will only be adjusted for one or some of the gain steps, whereas no adjustment is made for the remaining gain steps.

By adjusting the signal level of the calibration signal, the feedback signal can be maintained within a given dynamic range, which is significantly smaller than the dynamic range of the gain to be calibrated. Consequently, noise and the effect of non-linearities can be minimised resulting in a more accurate calibration process. Therefore, the change in the signal level of the calibration signal associated with one or more gain steps is preferably such that the feedback signal is maintained within a given dynamic range.

In the preferred embodiment, the method of adjusting the signal level of the calibration signal is used to calibrate a gain range above the reference gain of $G_{T,Ref}$.

The reference signal level is preferably set towards the upper threshold of the dynamic range of the receiver path and the measurement path in order to minimise the impact of noise and non-linearities. However, increasing the gain of the transmitter will result in the signal level of the feedback signal increasing above the reference signal level and consequently overloading the receiver and/or measurement circuits. Hence, in the preferred embodiment, at least one gain step increasing the gain of the transmit path above the reference gain is associated with a decrease in the signal level of the calibration level, whereby the reference signal is kept within a given dynamic range.

Specifically, the gain of the first amplifier 123 is set or reset to the reference level and the signal level of the calibration signal is set to the default value. As a consequence of the previous calibration, the feed back signal is now at the reference signal level, and the signal level measurement unit 163 is measuring a value equal to the measurement reference value. The signal level of the signal generator i.e. of the calibration signal of the OFDM modulator 101 is now reduced by a known value, which in this embodiment is equal to a number of gain steps. As a specific example, the calibration signal level is reduced by 18 dB in order to calibrate 4 gain steps of approximately 3 dB. This will provide some margin at the highest gain setting. The signal level measurement unit 163 now measures a value, which apart from measurement error, is equal to the measurement reference value minus the gain change, i.e. 18 dB. This level is used as the new measurement reference value. The gain of the first amplifier 123 is then increased by a gain step, a new measurement is made by the signal level measurement unit 163 and the gain step is calibrated from the formula given as $$\Delta G(+1)=P(+1)-P_{Meas,Ref,CalComp}$$

wherein $P(+1)$ is the signal level measurement unit measurement in dB following the gain step, $P_{Meas,Ref,CalComp}$ is the calibration compensated measurement reference value in dB. In the ideal case $P_{Meas,Ref,CalComp}$ is equal to $P_{Meas,Ref}+\Delta P_{Cal}$. The absolute gain of this increased gain setting is thus $$G(1)=G_{T,Ref}+\Delta G(1)$$

The calibration is then continued in a similar fashion until all gain settings of the desired dynamic range have been covered.

In the preferred embodiment both the transmitter unit and the receiver unit is calibrated. When calibrating the receiver unit, the reference signal level is initially set as described for the transmitter calibration. The ADC switches are then switched to the upper position thereby connecting the signal level measurement unit 163 to the measurement point through the receiver path. The signal level of the feedback signal is at the reference signal level, and the signal level measurement unit is measuring a value corresponding to the measurement reference value. In the preferred embodiment, a calibration of an absolute gain of the receiver path is performed. Preferably, the receiver absolute gain calibration is performed immediately after the calibration of the transmitter unit's absolute gain and before the calibration of the entire dynamic gain range of the transmitter unit.

The calibration of the absolute gain of the receiver is preferably in response to the measurement reference value and the reference signal level. The attenuation of the attenuator 164 is known and thus the signal level at the input level of the receiver is known. The measurement reference value is a measure of the signal level at the ADCs, and thus the gain of the receive path can be calculated as the ratio between the input signal level and the signal level at the ADCs.

Specifically, the calibration of the absolute gain value of the receiver is performed by initially setting the gain of the receiver path to the minimum value. The reference signal level is set for the feedback signal, and the signal level measurement unit is coupled to the measurement point through the receiver path. The reference signal level and the attenuator ratio are preferably set such that the receiver input signal level corresponds to the upper threshold for the dynamic range of the receiver. The gain of the receiver is stepped up until the ADCs are overloaded. The gain of the receiver path is reduced by one step whereby the signal at the ADC input is brought back within range. The input signal level for the receiver is now at the maximum level and the signal level measurement unit indicates a power close to full scale. The signal level measurement unit 163 performs a measurement of the signal level and the measured value is used as the measurement reference value $P_{Meas,Ref}$. The current gain setting of the receiver path is now the reference gain setting $G_{R,Ref}$ determined as the difference between the receiver input signal and the measurement reference value, i.e.

$$G_{R,Ref} = \frac{P_{Meas,Ref}}{P_{Ref} - G_{Att}}$$

wherein $P_{Ref}$ is the reference signal level and $G_{Att}$ is the attenuation by the attenuator and all values are measured in dB.

Hence, the absolute gain of the receiver path at the reference gain setting is determined by the reference signal level, which as previously mentioned is set with high accuracy—especially if pre-calibration of the signal level detector is performed, the attenuation of the attenuator, which can be designed with high accuracy, and the accuracy of the signal level measurement unit, which is digital and thus can be designed with high accuracy. It thus follows, that a very accurate calibration of the absolute gain at the reference gain setting is achieved.

In the preferred embodiment, the attenuator is designed to provide an attenuation of 28 dB, such that for the preferred reference signal level of 18 dBm the signal level fed back to the receiver is −20 dBm. This level is the highest received signal level specified in the HiperLAN standard. If, for example, the measurement reference value is measured at 10 dBm, the gain at the reference gain setting is determined as 30 dB.

On initiating calibration of a dynamic range of the receiver unit, the feed back signal is set at the reference signal level. In the preferred embodiment, this is done for the calibration signal level close to the maximum value and the transmit gain setting at the reference setting.

Calibration of the receive gain is then performed by changing a gain parameter of the receiver unit by a gain step. In the embodiment of FIG. 1 the gain of the receiver path is for brevity and clarity shown to be adjusted at the IF amplifier 143 only. Preferably, this IF amplifier 143 has a digitally controlled gain, and the gain step of the receiver corresponds to changing the gain of the IF amplifier 143 to the nearest setting.

Measurements of the feedback signal level are made by the signal level measurement unit 163, and a relative effect of the gain step on the feedback signal is determined as a relative change in the feedback signal level required to achieve a predefined relationship between the at least one measurement and the measurement reference value. In the preferred embodiment, the predefined relationship is that the measurement of the signal level measurement unit is substantially equal to the measurement reference value. Specifically, the relative effect is determined by changing characteristics of the transmitter unit until the signal level measurement unit measures a value equal to the measurement reference value. The calibration of the gain step is then determined in response to the relative effect, and in the preferred embodiment it is determined as substantially being the same value as the relative effect.

In this embodiment the calibration of the gain step is thus set according to the change in the feedback signal level, which results in the measurement of the signal level measurement unit being equal to the measurement reference value. The change in the signal level of the feed back signal is determined from the changes made in the transmitter to achieve this. In the preferred embodiment, a gain of the transmitter and/or the signal level of the calibration signal are changed, and as the calibration of the transmitter in this embodiment precedes the calibration of the receiver, these values are known with high accuracy thus leading to an accurate calibration of the receiver unit gain step.

More specifically, the calibration of the receiver gain step is in the preferred embodiment primarily of gains that are higher than the reference gain setting as the reference gain setting is determined for the highest specified receiver input level. The gain step is thus to a higher gain of the receiver unit, and as the reference gain setting was set to result in an ADC signal level just below saturation, the ADC's will now be saturated or overloaded. The signal level of the calibration signal is consequently reduced by reducing the amplitude of the calibration signal generated by the digital signal generator comprised by the OFDM modulator 101. The calibration signal level is reduced until the signal level measurement unit 163 measures a value equal to the measurement reference value. The gain step is consequently calibrated as equal to the reduction in amplitude of the calibration signal. As this reduction is performed in the digital domain, it can be determined with high accuracy and thus the gain step is calibrated with high accuracy.

In the preferred embodiment, the described steps are repeated (similarly to the transmitter calibration) whereby a gain range of the receiver unit is calibrated with high accuracy. The dynamic range of the digital signal generator (OFDM modulator) and/or the DACs is typically limited, and therefore the preferred embodiment comprises changing a gain of the transmit path and adjusting the output level of the digital signal generator until the measurement reference value is measured by the measurement unit. This is preferably done prior to changing the gain of the receiver unit. Thus by changing a gain of the transmit path, such as the gain of the first amplifier, the dynamic range of the feedback signal level can be extended beyond the dynamic range of the digital signal generator. As the gain change of the transmitter path is associated with re-adjustment of the calibration signal level such that the signal level measurement unit 163 again measures the measurement reference value, the high accuracy of the calibration is maintained—even if the gain step of the transmit path has not been calibrated.

Thus, specifically in the preferred embodiment, a number of gain steps are calibrated by adjusting the calibration signal level within a given suitable range. However, when the calibration signal level is about to go beyond this dynamic range, the gain step of the receiver path is preceded by an increase in the gain of the transmit path by one or more. The calibration signal level is then adjusted until the measurement of the signal level measurement unit is the same as the measurement reference level. When this occurs the signal level of the feed back signal is identical to the level prior to adjusting the gain setting of the transmit path but the signal generator and thus the calibration signal level has been moved back towards the upper threshold of the dynamic range of the signal generator. The receiver gain is then increased by a gain step and the signal level of the calibration level is adjusted until the signal level measurement unit again measure a value corresponding to the measurement reference value. The gain step is then again calibrated as equal to the change in the signal level of the calibration signal generated by the digital signal generator.

In this way, the dynamic receiver gain range that can be calibrated is considerably extended beyond the dynamic range of the digital signal generator while retaining the calibration accuracy of the digital signal generator.

In the preferred embodiment, the calibration signal is a sinusoidal with constant amplitude. This provides the advantage that the measurement process is not affected by changes in the signal level of the calibration signal, and for the simple peak detector used as a signal level detector in the preferred embodiment, the relationship between the output level and the signal level at the input can easily be determined. However, in other embodiments other suitable signals may be used. Especially, if more complex signal level detectors, such as a root means square (rms) signal level detector is used, more complex calibration signals may be used. Thus, any signal having time variations limited to significantly less than the averaging interval of the measurement process may be used, and in particular actual modulated communication signals may be fed back and used for calibration. This is especially attractive in transceivers for modulation formats having relatively constant amplitude, such as Gaussian Minimum Shift Keying (GMSK), but also Quadrature Amplitude Modulation (QAM) signals or even OFDM signals may be used in some embodiments.

In some embodiments, the same low pass filters are used for the transmitter unit and the receiver unit in a time multiplexed fashion. In this case a simple pair of auxiliary filters or no filters at all are used in the receive path during gain calibration. This does not degrade the calibration precision because the filters have a precise gain of one.

As will be appreciated from the above description the accuracy of the absolute calibration is dependent on the precision of the measurement path through the signal level detector. Signal detectors typically have a limited dynamic range with high accuracy and reduced accuracy outside this range. Therefore, the signal level detector has a limited dynamic input range of low distortion and the reference signal level is set to fall within this dynamic range.

Hence, specifically in the preferred embodiment, a very simple signal level detector is used. The key parameter for the accuracy of this detector is the diode characteristic and variations in this. For a typical diode, the diode on-voltage will vary between a maximum of 400 mV and a minimum of 100 mV. Thus, the inaccuracy of the power level detector is in the order of 300 mV and therefore the reference signal level is chosen as high as possible. For the preferred reference signal level of –018 dBm the peak value of the sinusoid is 2.5 volt, and the possible detector variation is 14% or 1.16 dB. However, this value can be substantially reduced by pre-calibrating the signal level detector during manufacturing. At lower values of the feedback signal level, the inaccuracy will increase significantly. A significant advantage of the calibration method described is that the measurement path, and thus the signal level detector, is only used for the feedback signal being at the reference signal level, and thus that a simple low cost signal level detector can be used while still resulting in a high degree of accuracy of calibration across an extensive gain range.

The accuracy of the absolute value of the receiver gain is further dependent on the accuracy of the attenuator. For a simple resistive attenuator as shown in FIG. 1, the precision of the attenuator increases as the attenuation is reduced, and therefore it is desirable to have as low attenuation as possible. However, a low attenuation requires a low reference signal level and therefore conflicts with the requirements for the signal level detector. Hence a suitable trade-off must be determined, which in the preferred embodiment is at a reference signal level of –18 dBm and an attenuation of 38 dB.

For brevity and clarity, the described embodiment has considered only one element of the transmit path and/or receive path having variable gain. However, it is within the contemplation of the invention that any number of adjustable or variable elements may be used, and any suitable method of adjusting or varying these can be employed.

The invention can be implemented in any suitable form including in hardware or any suitable combination of hardware and software. However, preferably all digital elements are implemented in an integrated circuit or in a suitable digital signal processor. The integrated circuit may further include the ADCs, DACs and some or all of the analog components. Thus, the steps required for the calibration may be implemented in any suitable form, but is preferably implemented as software or firmware in the integrated circuit or signal processing unit.

The invention thus tends to provide a number of advantages including some or all of the following:

It provides a simple method for automatic calibration of transceiver units.

It provides an accurate method of gain calibration.

The use of a measurement path only at a given reference signal level allows high accuracy even for simple and low cost implementations of the measurement path. Thus the invention provides accurate calibration using few and cheap measurement components An accurate absolute gain calibration can be performed at a reference signal level, and accurate gain calibration can be achieved for an entire gain range using accurate relative gain measurements, An accurate calibration of a large gain range is accomplished from a signal generator with lower dynamic range while maintaining the accuracy of the signal generator.

It provides a method of calibration wherein relative gain steps are calibrated very accurately due to the relative value being determined based only on digital measurements and adjustments.

A significant advantage of the calibration method described is that the measurement path and thus the signal level detector is only used for the feedback signal being at the reference signal level, and thus that a simple low cost signal level detector can be used while resulting in a high degree of accuracy of calibration across an extensive gain range much larger than the dynamic range of the signal generator yet retaining the calibration accuracy of this.

The invention claimed is:

1. A method (200) of gain calibration for a transceiver having a transmitter unit and a receiver unit including a measurement unit and including two feed back coupling paths from the transmitter unit to the receiver unit, the method comprising the steps of:

setting (201) a reference signal level of a feedback signal from the transmitter unit by adjusting characteristics of the transmitter unit in response to a measured signal level;

measuring (203) by the measurement unit, a measurement reference value associated with the reference signal level when sent via a first feed back coupling path;

measuring, by the measurement unit, at least one measurement of a signal level transmit on a second feed back coupling path from the transmitter unit via a receiver path;

changing (205) a gain parameter of a transceiver unit of the transceiver by a gain step;

measuring (207), by the measurement unit a gain adjusted feedback signal level of the second feedback coupling path;

determining (209) an effect of the gain step on the feedback signal level relative to said measurement reference value; and calibrating (211) the gain step according to said relative effect of the gain step on the feedback signal.

2. A method as claimed in claim 1 wherein the relative effect is determined as a relative change of the at least one measurement with respect to the measurement reference value.

3. A method as claimed in claim 2 wherein the relative effect is determined as the difference between the at least one measurement and the measurement reference value.

4. A method as claimed in claim 1 wherein the relative effect is determined as a relative change in the feedback signal level required to achieve a predefined relationship between the at least one measurement and the measurement reference value.

5. A method as claimed in claim 4 wherein the predefined relationship is that the at least one measurement is substantially equal to the measurement reference value.

6. A method as claimed in claim 4 wherein the step of calibrating the gain step comprises determining the gain step as substantially being the same value as the relative effect.

7. A method as claimed in claim 1, wherein the transmitter comprises a signal generator coupled to the feed back coupling through a transmit path having a transmit path gain and further comprising the step of:
setting a known level at the signal generator;
adjusting the transmit path gain until the measurement unit, when connected to a measurement point through the signal level detector, measures a level equal to the measurement reference value; and
calibrating an absolute value of the transmit path gain as a function of the known signal level and a predetermined relationship between the reference signal level and a measurement value of the measurement unit when connected to the measurement point through the signal level detector.

8. A method as claimed in claim 7 wherein the transmitter unit comprises a digital signal generator for generating a calibration signal coupled to the measurement point through the transmit path, the transmit path being an analog transmit path.

9. A method as claimed in claim 8 wherein the gain step is associated with a change of a signal level of the calibration signal and the calibration of the gain step is further in response to the change in the signal level of the calibration signal whereby the feedback signal is maintained within a given dynamic range.

10. A method as claimed in claim 1 wherein the receiver comprises a receive path having a receive path gain and further comprising the step of calibrating an absolute value of the receive path gain in response to the measurement reference value and the reference signal level.

11. A method as claimed in claim 1 wherein the transceiver unit is the transmitter unit having a transmit path having a transmit path gain and the gain step is a gain step of the transmit path gain.

12. A method as claimed in claim 1 wherein the transceiver unit is the receiver unit having a receive path gain and the gain step is a gain step of the receive path gain.

13. A method claimed in claim 12 wherein the transmitter unit comprises a digital signal generator for generating a calibration signal coupled to the measurement path through a transmit path, and the relative change in the feedback signal level required to achieve a predefined relationship between the at least one measurement and the measurement reference value is determined by adjusting an output level of the digital signal generator.

14. A method as claimed in claim 13 further comprising the step of changing a gain of the transmit path and adjusting the output level of the digital signal generator such that the measurement reference value is measured by the measurement unit.

15. A method as claimed in claim 1 wherein the feedback signal is a calibration signal of constant amplitude.

16. A method as claimed in claim 1 wherein the measurement unit is digital and the coupling from the measurement point to the measurement unit through the signal level detector does not comprise any analog signal path of the receiver unit.

17. A method as claimed in claim 1 wherein the steps of changing the gain parameter, measuring the at least one measurement, determining a relative effect and calibrating the gain step are iterated, whereby calibration across a dynamic gain range is achieved.

18. A method as claimed in claim 17 wherein the step of determining the relative effect is further in response to the relative effect determined in previous iterations.

19. A method as claimed in claim 1 wherein the signal level detector has a limited dynamic input range of low distortion, and the reference signal level is set to fall within this dynamic range.

20. A method as claimed in claim 1 further comprising the step of pre-calibrating a measurement of the measurement unit when measuring the reference signal level through the signal level detector.

21. An apparatus (100) for gain calibration for a transceiver having a transmitter unit and a receiver unit having a measurement unit, the apparatus comprising:
two feed back coupling paths from the transmitter unit to the receiver unit;
a level adapter (169) for setting a reference signal level of a feedback signal from the transmitter unit by adjusting a characteristic of the transmitter unit in response to a measured signal level;
a signal level measurement unit (163) measuring a measurement reference value associated with the reference signal level, when sent via a first feed back coupling path and measuring at least one measurement of a signal level transmit on a second feed back coupling path from the transmitter unit via a receiver path;
a gain adjustment function for changing a gain parameter of a transceiver unit of the transceiver by a gain step;
wherein the signal level measurement unit (163) measures a gain adjusted feedback signal level of the second feedback coupling path;
a determining function for determining an effect of the gain step on the feedback signal level relative to said measurement reference value; and
a calibrating function for calibrating the gain step according to said relative effect of the gain step on the feedback signal.

\* \* \* \* \*